(12) United States Patent
Chawla

(10) Patent No.: US 6,224,654 B1
(45) Date of Patent: May 1, 2001

(54) METHOD FOR ENHANCEMENT OF DUCT REMOVAL OUT OF CHIMNEY GASES

(76) Inventor: Daniel Chawla, Schubertstr. 42, D-76275 Ettlingen (DE)

( * ) Notice: Subject to any disclaimer, the term of this patent is extended or adjusted under 35 U.S.C. 154(b) by 0 days.

(21) Appl. No.: 09/359,506

(22) Filed: Jul. 23, 1999

(51) Int. Cl.$^7$ .................................................. B01D 45/08
(52) U.S. Cl. .................. 95/269; 55/325; 55/442; 55/444; 55/447; 55/DIG. 25; 95/272; 96/55
(58) Field of Search ...................... 96/55, 57, 61; 95/63, 69, 70, 267, 269, 272; 55/440, 441, 442, 443, 444, 445, 446, 447, DIG. 25, 337, 320, 322, 325

(56) References Cited

U.S. PATENT DOCUMENTS

| | | | |
|---|---|---|---|
| 1,405,613 | * | 2/1922 | Milliken .......................... 55/DIG. 25 |
| 2,013,644 | * | 9/1935 | Bubar ...................................... 95/269 |
| 3,389,974 | | 6/1968 | Baratini et al. . |
| 3,785,620 | | 1/1974 | Huber . |
| 3,813,856 | * | 6/1974 | Jensen ...................................... 55/444 |
| 4,036,461 | | 7/1977 | Soligno . |
| 4,062,524 | | 12/1977 | Brauner et al. . |
| 4,570,883 | | 2/1986 | Wepfer . |
| 4,637,455 | | 1/1987 | Tordonato . |
| 4,832,710 | * | 5/1989 | Jury .......................................... 96/57 |
| 5,238,055 | | 8/1993 | Kelley . |
| 5,318,609 | * | 6/1994 | Kittler .................................... 55/445 |
| 5,500,271 | * | 3/1996 | Pasch et al. ............................ 55/445 |
| 5,536,288 | * | 7/1996 | DeWitt et al. .......................... 95/272 |
| 5,813,451 | | 9/1998 | Chawla . |
| 5,816,317 | | 10/1998 | Chawla . |
| 6,007,593 | * | 12/1999 | Dullien ............................ 55/DIG. 25 |
| 6,051,041 | * | 4/2000 | Wurz et al. ...................... 55/DIG. 25 |

OTHER PUBLICATIONS

Kurt Leschonski, et al., "The Measurement of the Separation of Fine Solid Particles in Multiwir Packings", *Part. Part. Syst. Charact.* vol. 15, pp. 274–280 (Oct. 1998).

Jan Kwasniak, "Application of the Multivir Method to Separation of Droplets and Solid Particles From Gases", *Chemical Engineering Process,* vol. 24, pp. 211–215 (Sep. 1988).

J. Kwasniak, et al., Stromungsfelder, Partikelabscheidung und Druckverlust in Multiwir–Packungen, *Chemical Engineering Process,* pp. 1–10 (Sep. 1988).

Peter Weib, Untersuchungen am Multiwir–Tropfenabscheider, Dralluckgewinnung in Zyklontauchrohen, *Studienarbeit am Institut fur Mechanische Verfahrenstechnik*, pp. 1–T6 (Stuttgart 1993).

Joachim Fischer, "Partikelabscheidung in Multiwir—Packungen", Zugl: Clausthal, Techn. Univ. Diss., Papierflieger, Clausthal–Zellerfeld, pp. 1–196 (Aug. 1996).

Chem. Eng. Process. 24 p. 211–215 ,"Application of the 'Mutlivir38 Method to Separation of Droplets and Solid Particles from Gases" by Jan Kwasniak (1988).

* cited by examiner

Primary Examiner—Duane S. Smith
(74) Attorney, Agent, or Firm—Jaeckle Fleischmann & Mugel, LLP

(57) ABSTRACT

A method of removing dust from dust laden gases said method including the sequential steps of: (1) passing a flow of gases laden with dust particles, at a selected first gas stream velocity through a first dust removing mechanism capable of creating multiple vortexes of gases; (2) agglomerating the dust particles of the gases as they pass through the first dust removing mechanism said first gas stream velocity being selected to cause agglomeration of said dust particles; (3) passing the gas stream carrying agglomerated particles at a selected second gas stream velocity through a second dust removing mechanism capable of creating multiple vortexes of gases; (4) removing the agglomerated dust particles as they pass through the second dust removing mechanism at said second gas stream velocity; wherein the second gas stream velocity is substantially slower than the first gas stream velocity.

33 Claims, 5 Drawing Sheets

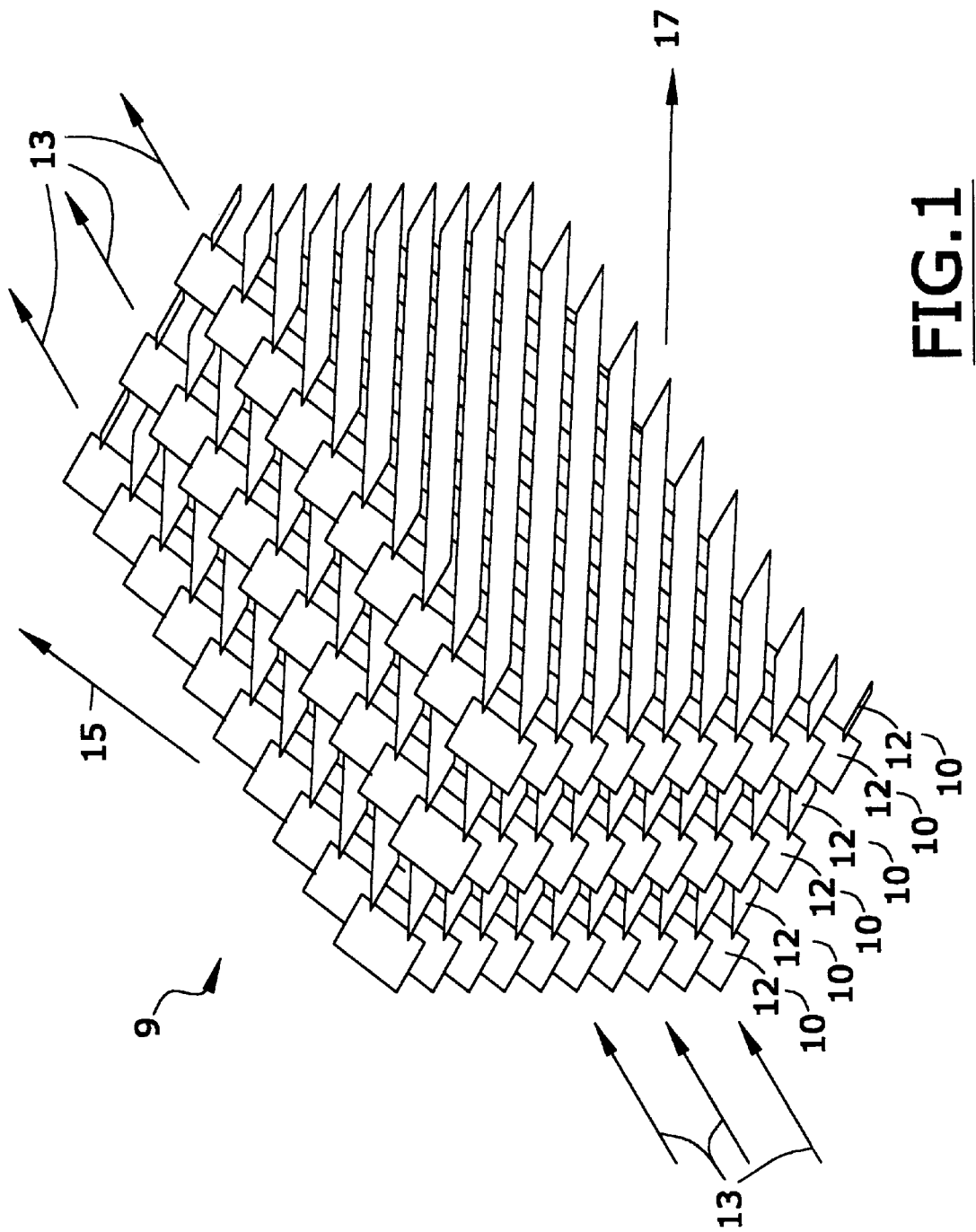

METHOD FOR ENHANCEMENT OF DUCT REMOVAL OUT OF CHIMNEY GASES

BACKGROUND OF THE INVENTION

Dust particles must be removed from chimney gases of factories to improve the environment and comply with legal environmental standards. A number of methods are available for the dust collection of the outgoing gases. For example, bag filters, electrostatic precipitators (ESP) and cyclones have been used in the past. Kwasniak, *Application of the Multiwir Method to Separation of Droplets and Solid Particles from Gases*, Institute of Chemical Engineering, Technical University of Lodz, ul, Zwirki 36, 90–924 Lodz (Poland), pp 211–2151 hereby incorporated by reference has suggested the use of 'Multiwir' packaging to separate droplets and solid particles from gases. U.S. Pat. No. 5,813,451 for an "Apparatus for Heat Transfer from Dust Laden Gases to Fluids", which is hereby incorporated by reference, describes the use of Multiwir packaging has been extended to remove solid particles and at the same time to recover waste heat out of dust laden gases. Multiwir, which is a type of filter consisting of a number of parallel plates, as shown in FIG. 1, is explained in further detail below.

In many cases the removal efficiency achieved with cyclones, ESP or in Multiwir is not sufficient to meet legal standards created for the protection of the environment. For example, if there is a large number of smaller (finer) particles present that are difficult to remove from the gases, or if the gas flow rate or the dust load has been increased substantially as compared to the amounts anticipated in the original design of the dust removal system.

It is an object of this invention to provide a substantial increase in the efficiency of dust removal, by dedusters to comply with legal standards and to benefit the environment.

SUMMARY OF THE INVENTION

It has been found that maximum dust removal can take place using a two-step process. The chimney gases are passed through two sets of Multiwirs, described below. First, the gases pass through a first Multiwir at a high rate of speed-preferably between approximately 8–14 m/s.

Second, the gases pass through a second Multiwir at a low rate of speed-preferably approximately 6.5 m/s or less.

A Multiwir is shown in FIG. 1. The Multiwir packaging consists of multiple adjacent layers of uniformly spaced parallel plates that are inclined at an angle to the flow of gas, the angle of one layer of parallel plates being oppositely inclined from, preferably substantially complementary to, that of the next adjacent layer. The parallel plates divide the gas streams that cross each other and collide, thereby causing vortices (whirling masses) of gases to be formed by the transfer of momentum between the gas streams.

During the first step, as the gases pass through the first Multiwir, the dust particles begin to agglomerate and produce larger particles. Agglomeration is the process in which particles grow by collision with and assimilation of other particles suspended in gases. Most of these larger particles, which are the result of agglomeration, flow into the second Multiwir.

During the second step, the agglomerated particles are removed. Thus, the invention provides for a method and apparatus for removing chimney dust by agglomerating the particles as they pass through a first Multiwir at a high rate of speed preferably between approximately 8–14 m/s, then removing the agglomerated particles as they pass through a second Multiwir at a low rate of speed, preferably approximately 2–6.5 m/s.

Ultimately a method is contemplated of (1) passing a flow of chimney gases laden with dust particles, at a certain velocity through a first Multwir, where the velocity is selected both to cause agglomeration of the dust particles and suspension of agglomerated particles in the gas stream; (2) agglomerating the dust particles of the gases as they pass through the first Multiwir; (3) passing the gas stream carrying agglomerated particles at a selected second gas stream velocity through a second Multwir; (4) removing the agglomerated dust particles as they pass through the second Multiwir at the second gas stream velocity;

wherein the second gas stream velocity is substantially slower than the first gas stream velocity.

BRIEF DESCRIPTION OF THE DRAWINGS

FIG. 1 shows the layout of a Multiwir apparatus.

DETAILED DESCRIPTION OF THE PREFERRED EMBODIMENT

Figure 1A:
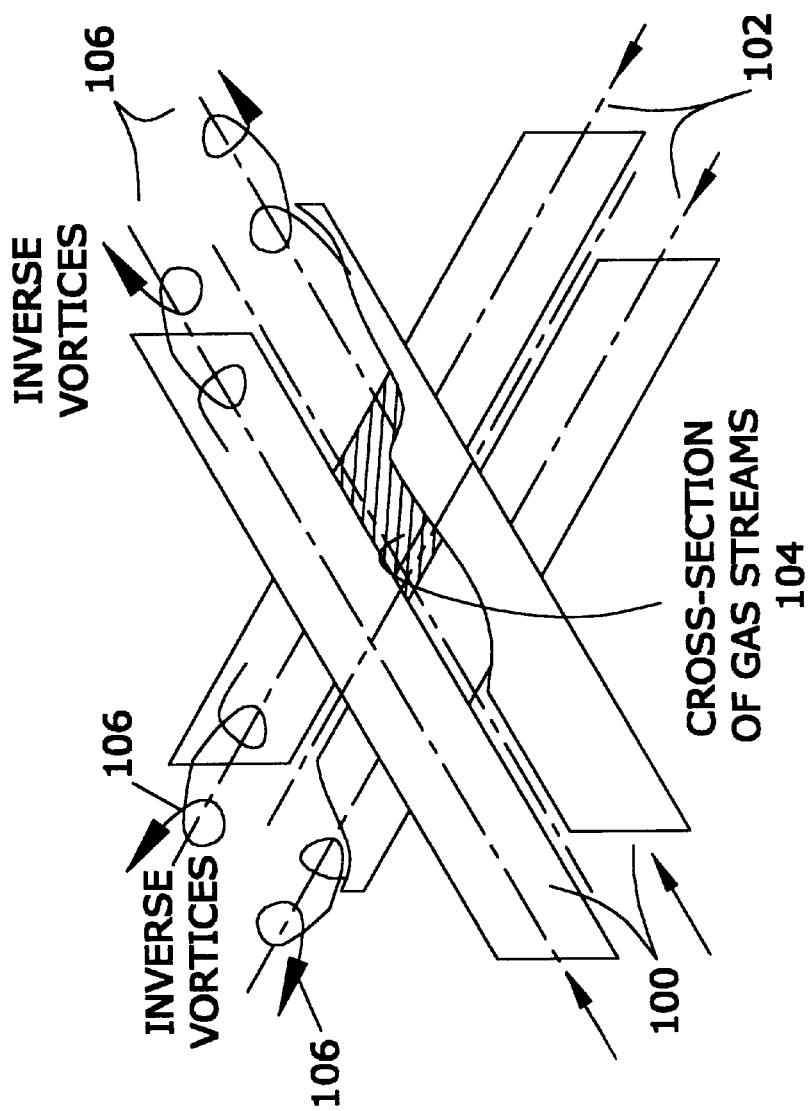
FIG. 1A shows the vortices of gases created by the apparatus of FIG. 1.

FIG. 1 shows a layout of Multiwir packing 9. Kurt Leschonski, Joachim Fischer, *The Measurement of the Separation of Fine Solid Particles in Multiwir Packings*, Particle & Particle Systems Characterization 15 (1998) p. 274–280 (which is hereby incorporated by reference) provides a detailed explanation of Multiwir Packaging. FIG. 1 shows a Multiwir packaging consisting of layers 10 of parallel plates 12 that crisscross. The parallel plates 12 are inclined at an angle to the flow of gas 13. The angle of one layer of parallel plates 12 is oppositely inclined from, preferably substantially complementary to, that of the next adjacent layer. The parallel plates 12 divide the gas stream 13 as the gas enters. The divided gas streams cross each other and collide, thereby causing vortices (whirling masses) of gases to be formed by the transfer of momentum between the gas streams. This is amply shown in FIG. 1(*a*). Note that in the preferred embodiment of the invention, one set of parallel plates 100 is inclined 45° in an upward angle, and the adjacent parallel plate 104 is inclined at −45° at a downward angle. The angles may also vary. Note the cross-section of the gas streams 104 where the inverse vortices 106 collide as they travel down the plates.

The adjacent layers 10 can be actually touching or in close proximity to one another. The plates 12 may be made of metal or plastic, and are placed on or very near the side of the layer 10 that precedes it, so as to be stacked sideways. In the interest of simplifying the diagram, only the parallel plates 12 for the first layer and second layer are numbered. These layers 10 are spaced uniformly. Each layer 10 is inclined at an angle opposite to that of its adjacent layer 10. Gas flow 13 is divided into narrow streams 15 & 17 which cross each other through the Multiwir packaging 9.

For purposes of the claims, a "Multwir" is defined as follows: "A packaging consisting of multiple adjacent layers of parallel plates that are either touching or in close proximity with one another; the parallel plates inclined at an angle to a flow of gas; the angle of one layer of parallel plates oppositely inclined from that of the next adjacent layer so as to substantially crisscross; the parallel plates spaced so as to divide the gas stream into multiple gas streams that cross each other and collide, thereby causing vortices of gases to be formed by the transfer of momentum between the multiple gas streams."

In FIG. 1, the gas streams moving upward are represented by 15, and the gas streams that move downward are represented by 17. Only the gas streams of the outermost layers are shown, also so as to simplify the diagram. As a result of the reciprocal transfer of momentum in a transverse direction in relation to the principal direction of flow, the streams induce rotational motion in each other. The solid particles are thrown from the center of the channel to the walls of the Multiwir 9 due to centrifugal forces. Dust is collected at the walls and in the corners of the packaging and can be removed from time to time by applying mechanical vibration.

Figure 2:
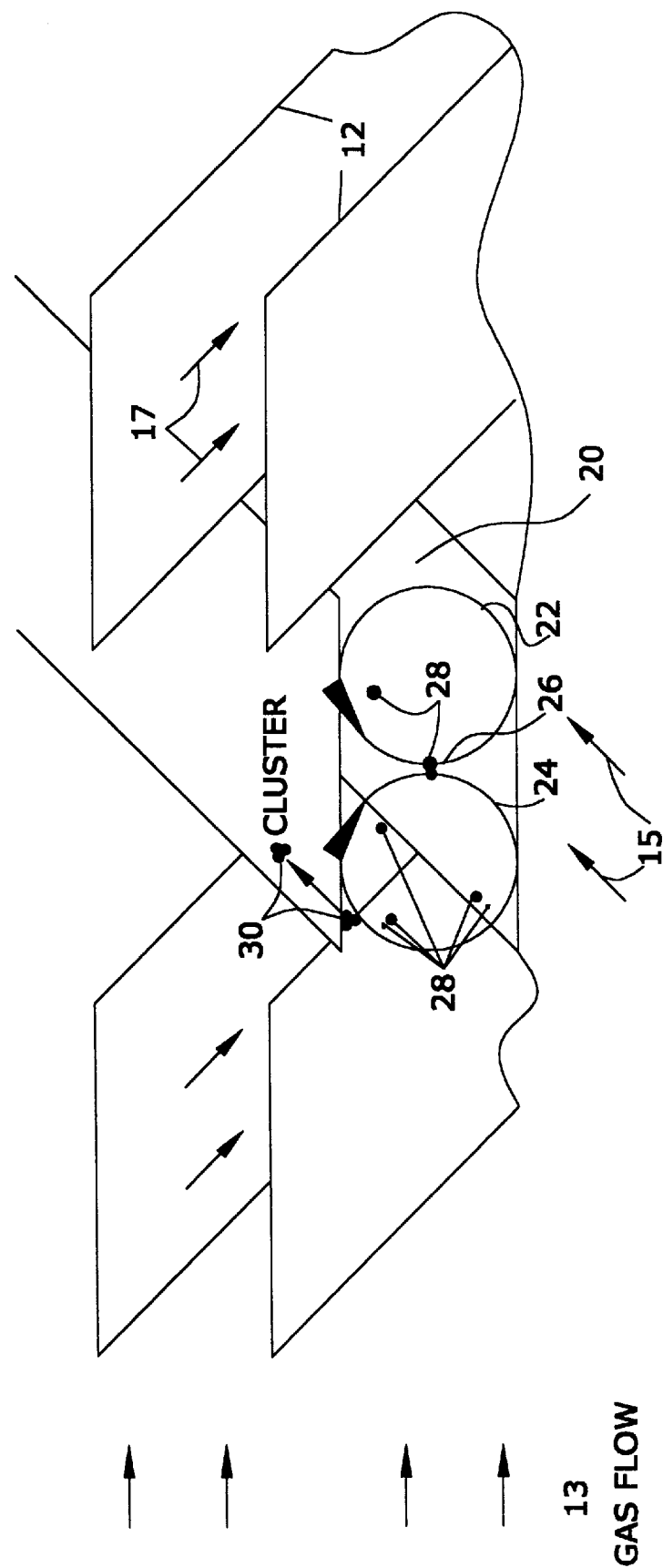
FIG. 2 shows a single channel formed by two plates of the Multiwir.

FIG. 2 shows one of the channels 20 of the Multiwir created in the area between the two parallel plates. In each channel, there are three different mechanisms agglomeration. First, in every channel, there are two vortices 22 and 24 rotating in opposite directions, one clockwise, and the other counter-clockwise. Both vortices 22 & 24 touch each other in the middle of the channel 26 with a very high relative velocity and carry solid particles 28 which collide with each other and lead to agglomeration. Second, because the velocity is high, even very small particles are thrown to the plates and subsequently agglomerate in clusters 30 along the plates. Third, on their way to the plates bigger particles capture smaller particles.

It has been noticed in practice that the removal efficiency in the Multiwir 9 increases with the gas flow velocity up to a particular gas velocity but that for very high velocities above the threshold, there is a decrease in removal efficiency. This is due to the fact that the particles already separated and clinging to the walls 30 of the Multiwir 9 leave the walls of the Multiwir 9 because of high shear forces caused by the gas flow 13. We found that, at a gas stream velocity of about 8–14 m/s, agglomerates clinging to the walls are removed by the gas stream 13.

In investigating dust removal using a Multiwir at a pig iron plant, we noticed that at high gas velocity, above 8 m/s, the removal efficiency decreases. At the same time, we have found that the particles leaving the Multiwir 9 at very high velocities were bigger particles than at the entrance. This means agglomeration had taken place, even though dust particle removal was low. Thus, high speeds meant high agglomeration of dust particles, but poor removal efficiency. We sought a way to enjoy the benefits of agglomeration of greater amounts of dust particles, but still have high amounts of removal of dust particles.

Figure 3:
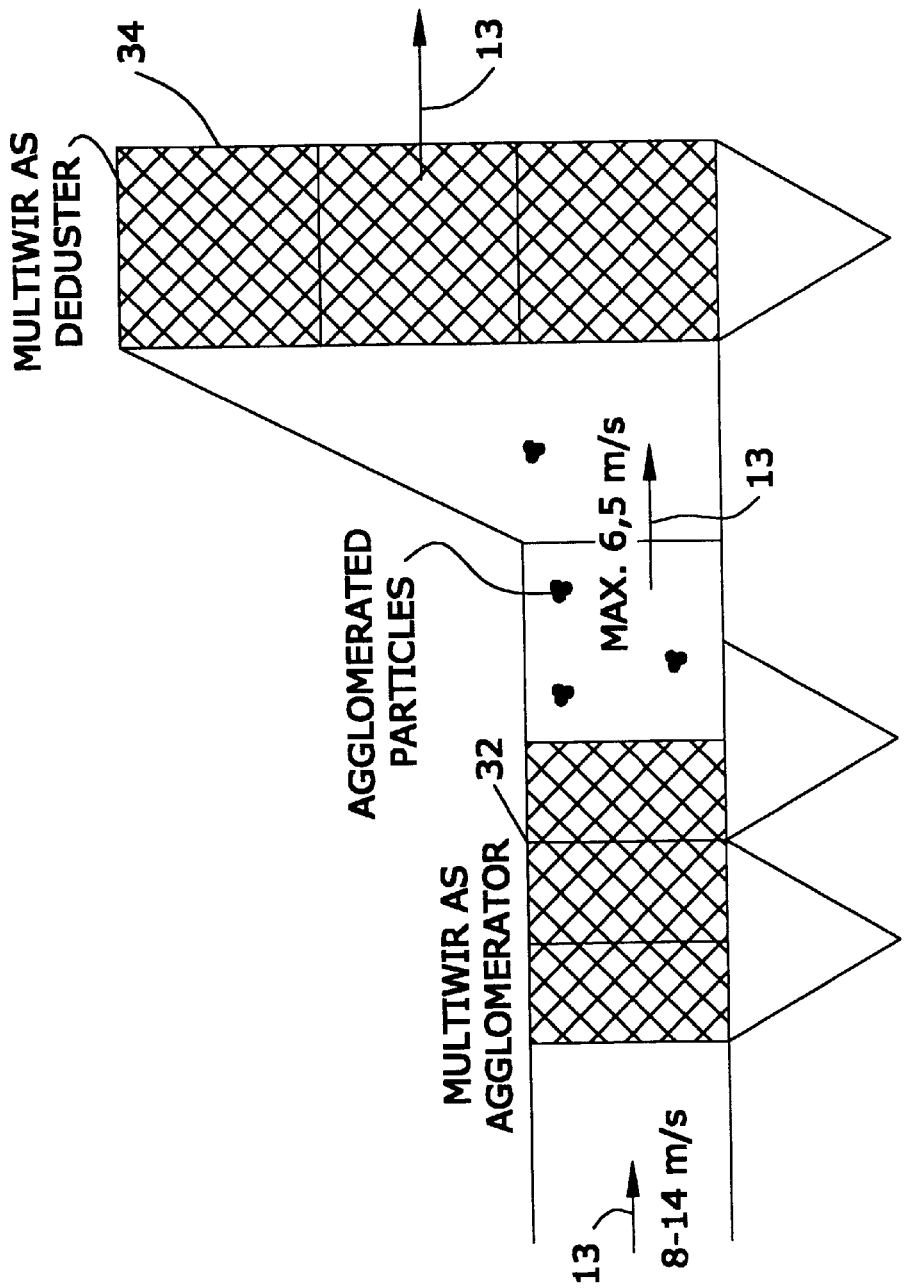
FIG. 3 shows a preferred embodiment of the invention.

FIG. 3 shows a preferred embodiment of the invention, in which the chimney gases 13 first pass through a first Multiwir 32 at about 8–14 m/s, and then through a second Multiwir 34 at about 2–6.5 m/s or less. The high gas velocity of the first Multiwir 32 leads to very high frequency of vortex generation, which causes the particles to agglomerate on the walls 30. However, because the forces of the streams 13 are very high, and the clusters agglomerated at the wall 30 do not stay there but are lifted again from the wall and float with the gas stream 13. This gas stream 13, now laden with agglomerated particles that were not removed by the first Multiwir 32, enters the second Multiwir 34, which operates at a maximum gas velocity of 6.5 m/s. In the second Multiwir 34, most of the agglomerated particles are removed. The gas stream velocities through the first and second Multiwirs can be adjusted, depending on the particle size distribution in the feed gas, to optimize the removal of the particles.

Figure 4:
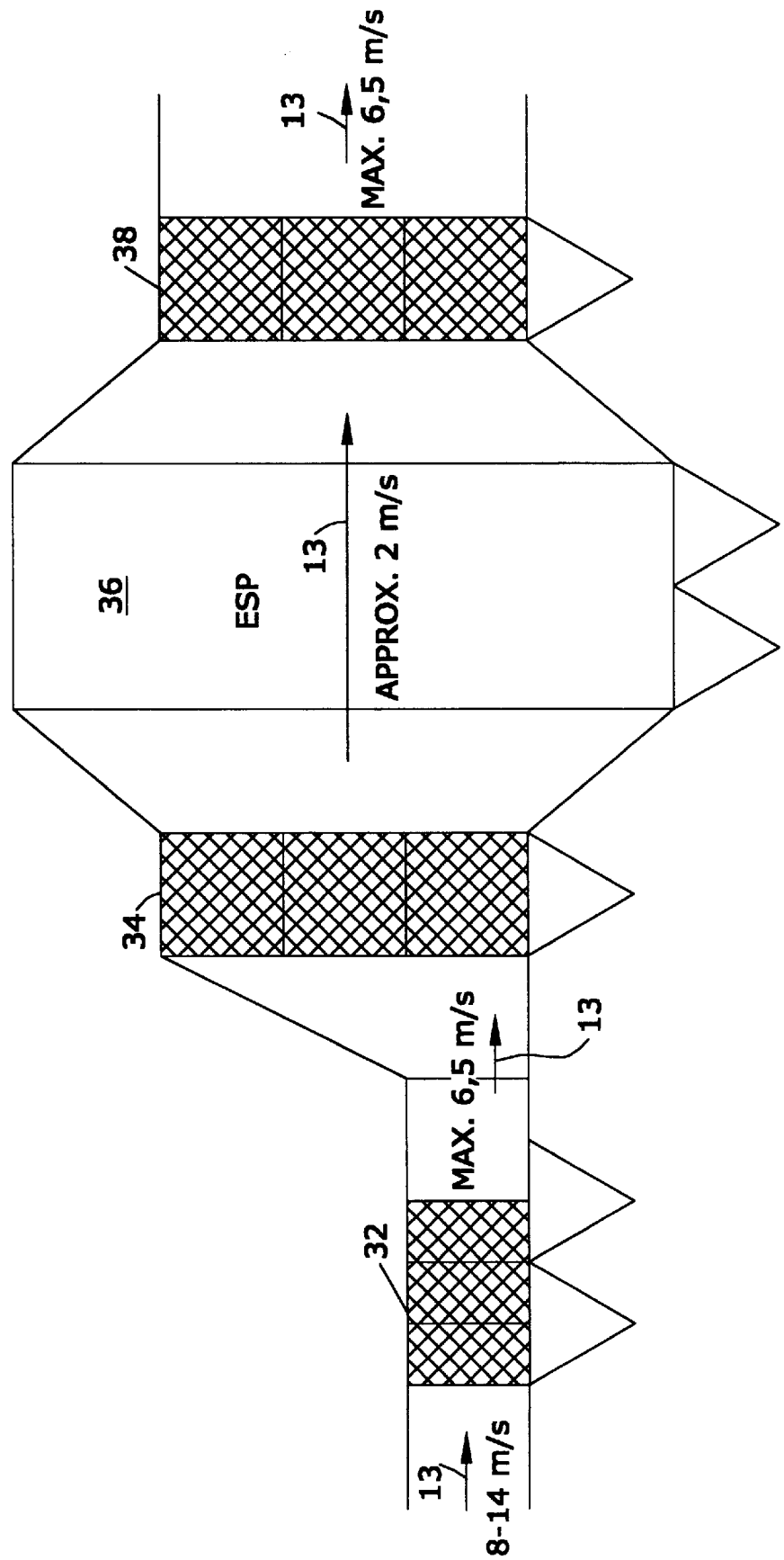
FIG. 4 shows another embodiment of the invention which uses an ESP.

FIG. 4 shows an arrangement where the invention is used to improve an electrostatic precipitator (ESP), a device that removes dust or other finely divided particles from a gas by charging the particles inductively with an electric field, then attracting them to highly charged collector plates. As in the first embodiment of the invention, agglomeration first takes place as gases pass through a first Multiwir 32 at 8–14 m/s. A second Multiwir 34 operating at a gas velocity of maximum 6.5 m/s removes the agglomerated particles and the larger particles. Any particles remaining in the gas stream 13, are charged electrically and removed in the ESP 36. The gas stream 13 is then put through a third Multiwir 38 which is connected to the earth, the gas stream velocity being approximately 6.5 m/s. Particles are removed by centrifugal forces and electrical forces. In that way, even very small particles can be separated from the gases.

FIGS. 2 and 3 show only two preferred embodiments. Other combinations using various dedusters give beneficial results. For example bag filters, or cyclones will also work better if the particles are agglomerated in a first Multiwir at high speeds, and then removed in a second Multiwir at low speeds.

The disclosed embodiments are merely exemplary of our invention. Therefore specific structural and functional details disclosed herein are not to be interpreted as limiting, which is defined by the following claims.

I claim:

1. A method of removing dust from dust laden gases said method comprising the steps of:

passing a flow of gases laden with dust particles at a selected first gas stream velocity through a first dust removing mechanism capable of creating multiple vortexes of gases;

agglomerating the dust particles of the flow of gases as the flow of gases passes through the first dust removing mechanism, said first gas stream velocity being selected to cause agglomeration of said dust particles;

passing the gas stream carrying agglomerated particles at a selected second gas stream velocity through a second dust removing mechanism capable of creating multiple vortexes of gases;

further aglomerating the dust particles as the gas stream flows through the second dust removing mechanism;

removing the agglomerated dust particles as the gas stream passes through the second dust removing mechanism at said second gas stream velocity;

wherein the second gas stream velocity is substantially slower than the first gas stream velocity, the second gas stream velocity being selected to cause further agglomeration of said dust particles and to preclude carrying of agglomerated particles from the second dust removing mechanism.

2. The method of claim 1 wherein the first and second mechanisms capable of creating multiple vortexes of gases each comprises:

an array of layers adjacent to one another each said layer comprising a plurality of substantially parallel plates and inclined at a selected angle to the flow of gases, one said layer being inclined at an angle opposite to the angle of an adjacent layer;

wherein the parallel plates divide the gases into a plurality of gas streams moving in different directions the gas streams crossing each other and colliding so that vortices of gases are formed by transfer of momentum between the gas streams.

3. The method of claim 2 wherein the first and second mechanisms capable of creating multiple vortexes of gases are both respectively further comprised of:

the different layers of parallel plates being arranged in opposite directions so as to a substantially constant angle between adjacent layers;

every other layer being substantially parallel with each other;

the velocity of the gases and the angle between adjacent layers being sufficient to create vortex of enough power to force dust particles to the plates;

the plates spaced so that they form channels having at least two vortexes rotating in opposite directions; the plates of each layer substantially uniformly spaced.

4. The method of claim 1 further comprising:

the second gas stream velocity being at least about 1.25 times slower than the first gas stream velocity.

5. The method of claim 2 further comprising:

the second gas stream velocity being at least about 1.25 times slower than the first gas stream velocity.

6. The method of claim 3 further comprising:

the second gas stream velocity being at least about 1.25 times slower than the first gas stream velocity.

7. The method of claim 1 further comprising:

the second gas stream velocity being approximately 6.5 m/s or slower;

the first gas stream velocity being greater than approximately 8 m/s.

8. The method of claim 1 further comprising:

the second gas stream velocity being approximately 4 m/s or slower;

the first gas stream velocity being greater than approximately 10 m/s.

9. The method of claim 2 further comprising:

the second gas stream velocity being approximately 6.5 m/s or slower;

first gas stream velocity being greater than approximately 8 m/s.

10. The method of claim 1 further comprising:

the second gas stream velocity being approximately 4 m/s or slower;

the first gas stream velocity being greater than approximately 10 m/s.

11. The method of claim 3 further comprising:

the second gas stream velocity being approximately 6.5 m/s or slower;

the first gas stream velocity being greater than approximately 8 m/s.

12. The method of claim 1 further comprising:

the second gas stream velocity being approximately 4 m/s or slower;

the first gas stream velocity being greater than approximately 10 m/s.

13. The method of claim 1 further comprising:

the second gas stream velocity being approximately 6.5 m/s or slower;

the first gas stream velocity being approximately 8 m/s–14 m/s.

14. The method of claim 2 further comprising:

the second gas stream velocity being approximately 6.5 m/s or slower;

the first gas stream velocity being approximately 8 m/s–14 m/s.

15. The method of claim 3 further comprising:

the second gas stream velocity being approximately 6.5 m/s or slower;

the first gas stream velocity being approximately 8 m/s–14 m/s.

16. The method of claim 3 further comprising:

the second gas stream velocity being approximately 4 m/s or slower;

the first gas stream velocity being approximately 10 m/s–14 m/s.

17. An apparatus for removing dust from gases, comprising:

means for agglomerating dust particles of gases at a high gas stream velocity using a Multiwir; and means for removing dust particles of gases at a low gas stream velocity using a Multiwir;

wherein each said Multiwir comprises:

a pluralty of plate layers adjacent to each other, each of said plurality of plate layers being one of in contact with and in close proximity to adjacent plate layers, each of said plurality of plate layers having a respective plurality of plates, each respective plurality of plates within a respective plate layer being substantially parallel relative to each other and being at a predetermined angle relative to a flow of gas, said predetermined angle alternating between a first angle and a second angle in adjacent plate layers, said first angle being opposite said second angle relative to the flow of gas, said plurality of plate layers configured for dividing the flow of gas into multiple gas streams which cross each other and collide to thereby form vortices of gases by the transfer of momentum between the multiple gas streams.

18. The apparatus of claim 17 wherein the high gas stream velocity is at least about 1.25 times the low gas stream velocity.

19. The apparatus of claim 17 wherein the high gas stream velocity is greater than approximately 8 m/s but less than approximately 14 m/s and the low gas stream velocity is less than or equal to approximately 6.5 m/s.

20. The apparatus of claim 17 wherein the high gas stream velocity is greater than approximately 10 m/s but less than approximately 14 m/s and the low gas stream velocity is less than or equal to approximately 4 m/s.

21. The apparatus of claim 17 where there is an electrostatic precipitator that is in gaseous communication with the means for removing dust particles.

22. The apparatus of claim 17 where there is an electrostatic precipitator that is in gaseous communication with the means for removing dust particles, and there is a second means for removing dust particles of gases at a low gas stream velocity using a Multiwir.

23. An apparatus for removing dust particles from gases comprising:

a first Multiwir for agglomerating dust particles from gases at high velocities;

a second Multiwir for removing dust particles from gases at low velocities; the second Multiwir in gaseous communication with the first Multiwir;

wherein each said Multiwir comprises:
a plurality of plate layers adjacent to each other, each of said plurality of plate layers being one of in contact with and in close proximity to adjacent plate layers, each of said plurality of plate layers having a respective plurality of plates, each respective plurality of plates within a respective plate layer being substantially parallel relative to each other and being at a predetermined angle relative to a flow of gas, said predetermined angle alternating between a first angle and a second angle in adjacent plate layers, said first angle being opposite said second angle relative to the flow of gas, said plurality of plate layers configured for dividing the flow of gas into multiple gas streams which cross each other and collide to thereby form vortices of gases by the transfer of momentum between the multiple gas streams.

24. The apparatus for removing dust particles from gases of claim 23 further comprising:
the high gas velocity of the first Multiwir being greater than approximately 8 m/s;
the low gas velocity of the second Multiwir being approximately 6.5 m/s or less.

25. The apparatus for removing dust particles from gases of claim 23 further comprising:
the high gas velocity of the first Multiwir being greater than approximately 10 m/s but less than approximately 14 m/s;
the low gas velocity of the second Multiwir being approximately 4 m/s or less.

26. The apparatus for removing dust particles from gases of claim 23 further comprising:
an electrostatic precipitator in gaseous communication with the second Multiwir.

27. The apparatus for removing dust particles from gases of claim 24 further comprising:
an electrostatic precipitator in gaseous communication with the second Multiwir.

28. The apparatus for removing dust particles from gases of claim 25 further comprising:
an electrostatic precipitator in gaseous communication with the second Multiwir.

29. The apparatus for removing dust particles from gases of claim 26 further comprising:
a third Multiwir for removing dust particles from gases at low velocities; the third Multiwir in gaseous communication with the electrostatic precipitator and receiving gases from it.

30. The apparatus for removing dust particles from gases of claim 27 further comprising:
a third Multiwir for removing dust particles from gases at low velocities; the third Multiwir in gaseous communication with the electrostatic precipitator and receiving gases from it; the low gas velocity of the third Multiwir being approximately 6.5 m/s or less.

31. The apparatus for removing dust particles from gases of claim 28 further comprising:
third Multiwir for removing dust particles from gases at low velocities; the third Multiwir in gaseous communication with the electrostatic precipitator and receiving gases from it; the low gas velocity of the third Multiwir being approximately 4 m/s or less.

32. The apparatus for removing dust particles from gases of claim 23 further comprising:
a bag filter in gaseous communication with the first and second Multiwir.

33. The apparatus for removing dust particles from gases of claim 23 further comprising:
a cyclone in gaseous communication with the first and second Multiwir.

* * * * *

UNITED STATES PATENT AND TRADEMARK OFFICE
CERTIFICATE OF CORRECTION

PATENT NO. : 6,224,654 B1
DATED : May 1, 2001
INVENTOR(S) : Daniel Chawla

It is certified that error appears in the above-identified patent and that said Letters Patent is hereby corrected as shown below:

The above-referenced patent (copy enclosed) contains a typographical error in the title. The correct title of this patent should read: "METHOD FOR ENHANCEMENT OF DUST REMOVAL OUT OF CHIMNEY GASES" The word "DUST" is misspelled in the title and incorrectly reads "DUCT" in the issued patent of the cover page and page one of the patent.

Signed and Sealed this

Eleventh Day of December, 2001

Attest:

*Nicholas P. Godici*

NICHOLAS P. GODICI
*Attesting Officer*     *Acting Director of the United States Patent and Trademark Office*